US011349222B2

(12) United States Patent
Faghih Imani et al.

(10) Patent No.: US 11,349,222 B2
(45) Date of Patent: May 31, 2022

(54) SYSTEMS AND METHODS FOR SENSING A LIFEFORM USING DYNAMIC METASURFACE ANTENNAS

(71) Applicant: Duke University, Durham, NC (US)

(72) Inventors: Seyedmohammadreza Faghih Imani, Durham, NC (US); Timothy Sleasman, Durham, NC (US); Jonah Gollub, Durham, NC (US); David Smith, Durham, NC (US)

(73) Assignee: Duke University, Durham, NC (US)

( * ) Notice: Subject to any disclaimer, the term of this patent is extended or adjusted under 35 U.S.C. 154(b) by 706 days.

(21) Appl. No.: 16/138,552

(22) Filed: Sep. 21, 2018

(65) Prior Publication Data

US 2020/0028270 A1    Jan. 23, 2020

Related U.S. Application Data

(60) Provisional application No. 62/561,881, filed on Sep. 22, 2017.

(51) Int. Cl.
*H01Q 15/00* (2006.01)
*G01S 13/56* (2006.01)
*H01Q 9/30* (2006.01)

(52) U.S. Cl.
CPC ......... *H01Q 15/0086* (2013.01); *G01S 13/56* (2013.01); *H01Q 9/30* (2013.01)

(58) Field of Classification Search
None
See application file for complete search history.

(56) References Cited

U.S. PATENT DOCUMENTS

| 2001/0009404 | A1* | 7/2001 | Paese .............. G01S 13/18 342/28 |
| 2014/0058255 | A1* | 2/2014 | Mase .............. A61B 5/0507 600/430 |
| 2017/0038463 | A1 | 2/2017 | Grbic et al. |
| 2017/0069967 | A1* | 3/2017 | Shrekenhamer ......... H01Q 1/28 |
| 2019/0094408 | A1 | 3/2019 | Boyarsky et al. |
| 2019/0103665 | A1 | 4/2019 | Yoo et al. |
| 2019/0154918 | A1 | 5/2019 | Arnitz et al. |
| 2019/0346545 | A1 | 11/2019 | Sleasman et al. |
| 2019/0377084 | A1 | 12/2019 | Sleasman et al. |
| 2020/0339415 | A1 | 10/2020 | Arnitz et al. |
| 2021/0018680 | A1 | 1/2021 | Arnitz et al. |
| 2021/0110561 | A1 | 4/2021 | Gollub et al. |
| 2021/0175630 | A1 | 6/2021 | Boyarsky et al. |

\* cited by examiner

*Primary Examiner* — Whitney Moore
(74) *Attorney, Agent, or Firm* — Casimir Jones, S.C.; Peter J. Schlueter

(57) ABSTRACT

The present disclosure provides systems and methods relating to sensing the presence of a lifeform. In particular, the present disclosure provides systems and methods for detecting the presence of a lifeform in a building or room using dynamic metasurface aperture (DMA), which overcome many limitations of currently available radio frequency (RF) or infrared (IR)-based systems.

20 Claims, 6 Drawing Sheets

SYSTEMS AND METHODS FOR SENSING A LIFEFORM USING DYNAMIC METASURFACE ANTENNAS

RELATED APPLICATIONS

This application claims priority to and the benefit of U.S. Provisional Patent Application No. 62/561,881 filed Sep. 22, 2017, which is incorporated herein by reference in its entirety for all purposes.

GOVERNMENT FUNDING

This invention was made with Government support under Federal Grant No. FA9550-12-1-0491, awarded by the Air Force Office of Scientific Research (AFORS). The Federal Government has certain rights to the invention.

FIELD

The present disclosure provides systems and methods relating to sensing the presence of a lifeform. In particular, the present disclosure provides systems and methods for detecting the presence of a lifeform in a building or room using dynamic metasurface aperture (DMA).

BACKGROUND

Sensing the presence of a lifeform, such as a human, in a building or a room inside a building is a valuable aspect of many different technological applications, including the detection of an intruder to enabling energy-efficient lighting or thermostats. One current approach for lifeform sensing relies on one or more motion detectors, such as radio frequency (RF) or infrared (IR) motion detectors, which generally detect a human's presence once he/she interrupts the RF or IR signal. These systems, while easy to operate and simple to implement, often times require a line-of-sight (LOS) path between the person and the sensor. That is, once a person enters an area occluded from the sensor, it cannot detect his/her presence. Further, many currently available sensors provide high false negative rates, such as failing to sense an immobile person. Although sensors that rely on RF signals emanating from electronics (e.g., laptops, smartphones, tablets) generally do not require LOS path detection, they are dependent on the person having some type of RF-detectable electronic device, which in many cases, may not accurately detect young children or the elderly. While some of the shortcomings of currently available sensors may be mitigated by employing a large network of sensors, the associated high cost and complexity of this approach is generally prohibitive.

SUMMARY

Embodiments of the present disclosure provide a motion detection system that includes a transmitting antenna configured to emit arbitrary radiation patterns at a single operating frequency, and at least one receiver antenna configured to collect one or more signals generated when an object alters the arbitrary radiation patterns emitted by the transmitting antenna. In accordance with these embodiments, the system is configured to capture temporal variations in a complex indoor environment.

In some embodiments, the transmitting antenna is a dynamic metasurface aperture (DMA). In some embodiments, the at least one receiver antenna is a DMA. In some embodiments, the at least one receiver antenna is a monopole antenna.

In some embodiments, the DMA comprises a three-dimensional cavity. In some embodiments, the three-dimensional cavity of the DMA comprises an artificial impedance surface and one or more varactor diodes. In some embodiments, a surface opposite the artificial impedance surface is perforated with a plurality of randomly positioned irises. In some embodiments, the system further includes a waveguide.

In some embodiments, the single operating frequency is at least about 5.0 GHz. In some embodiments, the single operating frequency is from about 5.0 to about 300.0 GHz. In some embodiments, the system operates at a wavelength of about 3.0 mm or less. In some embodiments, the operating wavelength is about 1.55 cm.

In some embodiments, the transmitting antenna is a dynamic metasurface aperture (DMA), and capturing temporal variations in a complex indoor environment includes using a plurality of DMA masks. In some embodiments, capturing temporal variations in a complex indoor environment includes detecting periodic motion of one or more objects and estimating a period of the one or more objects' motion based on intensity measurements from the plurality of DMA masks.

In some embodiments, detecting the one or more objects' periodic motion and estimating its period facilitates identification of the temporal variations in the complex indoor environment. In some embodiments, the temporal variations comprise one or more vital signs of a human subject.

Embodiments of the present disclosure also provide a method of detecting a lifeform in a complex indoor environment. In accordance with these embodiments, the method includes configuring a transmitting antenna to emit arbitrary radiation patterns at a single operating frequency, configuring at least one receiver antenna to collect one or more signals generated when an object alters the arbitrary radiation patterns emitted by the transmitting antenna, generating a temporal signature of the complex indoor environment by obtaining continuous transmission measurements, and identifying at least one temporal variation in the temporal signature.

In some embodiments, the transmitting antenna is a dynamic metasurface aperture (DMA), and the at least one receiver antenna is a DMA or a monopole antenna. In some embodiments, the DMA comprises a three-dimensional cavity that includes an artificial impedance surface and one or more varactor diodes. In some embodiments, a surface opposite the artificial impedance surface is perforated with a plurality of randomly positioned irises.

In some embodiments, the single operating frequency is from about 5.0 GHz to about 300 GHz. In some embodiments, the at least one temporal variations comprise one or more vital signs of a human subject.

BRIEF DESCRIPTION OF THE DRAWINGS

FIG. 1A includes a schematic of the experimental set-up. The transmission between a DMA and a monopole antenna is measured in a (large) disordered metallic cavity. The wavelength of operation is 1.55 cm. The cavity wave field is speckle-like as visualized by the vertical and horizontal slices. Two objects, outside the line-of-sight of the antenna pair, can be moved. FIG. 1B includes a schematic of the cavity-backed DMA: a (small) open, disordered cavity with partially tunable boundary conditions. FIG. 1C includes a schematic diagram of Object 1, which is a small aluminum block mounted onto a rotation stage. FIG. 1D includes a schematic diagram of Object 2, which is an L-shaped aluminum corner mounted onto a linear rail.

FIG. 3A includes representative data in the complex plane of 500 transmission measurements for a given cavity, using 500 different random masks (blue) or 500 times the same random mask (red). FIGS. 3B-3D include representative histograms of Z over many realizations; Z is the standard deviation of the change between two consecutive series of transmission measurements, $Z=SD(W(t_{i+1}, m)-W(t_i, m))_m$, as defined in Eq. 5. The top (bottom) row corresponds to cases in which no motion (motion) occurred in between the two-measurement series.

DETAILED DESCRIPTION

Figures 1A, 1B, 1C, 1D:
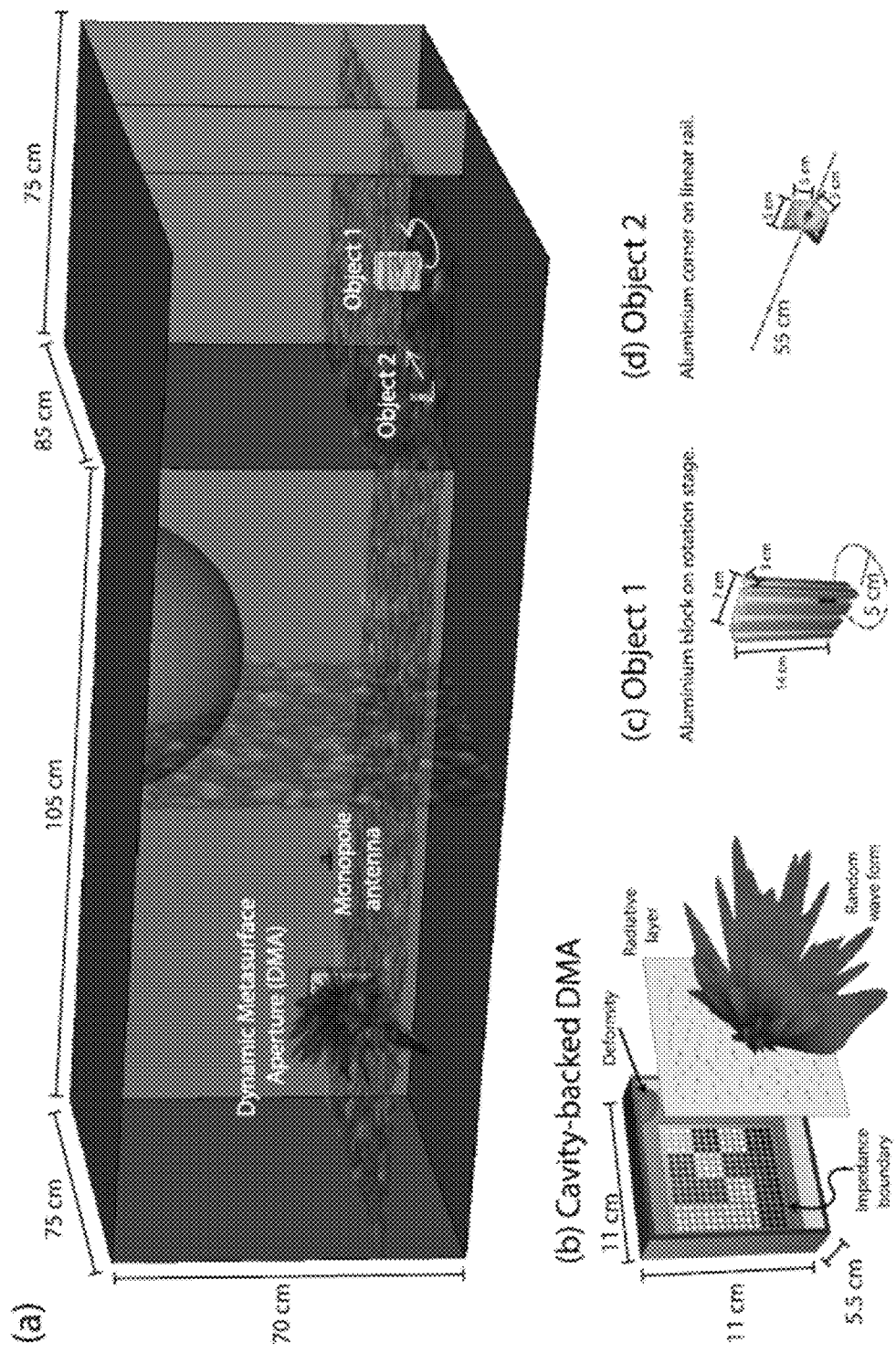
FIGS. 1A-1D include representative schematic diagrams of the DMA-based motion detection systems of the present disclosure.

The present disclosure provides systems and methods relating to sensing the presence of a lifeform. In particular, the present disclosure provides systems and methods for detecting the presence of a lifeform in a building or room using dynamic metasurface aperture (DMA), which overcome many limitations of currently available radio frequency (RF) or infrared (IR)-based systems.

Embodiments of the system include the use of a DMA as a sensor for detecting human presence in a room or building. A DMA typically includes a waveguide or a cavity with subwavelength metamaterial elements patterned into the structure. A simple RF source injects a signal into the waveguide or cavity, and the signal is then leaked out by the metamaterial elements. The overall radiation pattern of this structure is thus the superposition of many smaller contributions from metamaterial elements, which can be tailored to form spatially distinct patterns or directive beams. By incorporating switchable components into the metamaterial elements and tuning them independently, the DMA patterns can be altered with simple electronic circuitry without relying on complex and expensive hardware (e.g., phase shifters, amplifiers, or mechanical movement). Furthermore, DMAs are compatible with standard circuit broad fabrication and are thus efficient to manufacture. Overall, DMAs are planar, low power, and low-cost devices that can generate complex radiation patterns and vary their spatial patterns at a rapid rate, all of which facilitate accurate lifeform detection.

Embodiments of the present disclosure include one or more DMAs as the main hardware component of sensor architecture. More specifically, DMAs are used as transmitters and/or receivers to probe the scattering events inside the room/building. That is, a transmitting DMA generates a series of spatially distinct radiation patterns that illuminate the entire room—penetrating non-metallic objects (e.g., furniture) and bouncing from walls, ceiling, and floor—before arriving at the receiving DMA. When a subject (e.g., human) enters a room he/she interrupts one or several paths between the transmitter and receiver, causing variations in the received signal. The statistical variation in the signal collected by the receiver, as the subject enters or moves about the room, is used to detect the subject's presence.

In one embodiment of the present disclosure, detection of a human in a complex indoor environment is based on a method that involves treating the human as a moving scatterer in an otherwise static (time-invariant) multiple scattering environment (e.g., a room or a building). As a result, the multiple-scattering interactions inherent in a room/environment can be used to detect human presence and eliminate the need for direct paths or LOS scenarios. In fact, the DMAs' ability to generate distinct patterns enables the DMA system to probe all locations in room, regardless of room settings (e.g., specific distribution of furniture). Given the rapid rate at which a DMA can alter its patterns and the multiplexing effect of complex patterns generated by DMA, the scattering events inside the entire room/building can be monitored using only a few measurements. This capability enables the sensor to sense the room/building with fast acquisition rates (depending on the RF backend, acquisition rate can be on order of MHz to GHz), which are significantly faster than typical movements inside a room, allowing for the sensor to acquire temporal signatures of any movements inside the room. By populating a dictionary of different movements from previous measurements (e.g., walking human, sleeping human, ceiling fans, driers), the movement of human can be distinguished from unrelated movements (e.g., a fan) and establish human presence with high fidelity.

DMA systems can operate at millimeter wave frequency ranges. This frequency range is attractive for detecting human presence given the abundance and low cost of semiconductor and RF components. Electromagnetic waves at this frequency range have no harmful effect on humans or animals, but they can penetrate non-metallic objects (e.g., furniture, thin walls) or bounce off metallic objects, promising a wider area of operation and no LOS requirement. Furthermore, operating at such frequency ranges (e.g., 20 GHz) allows the system to be reasonably size (few centimeters), with sensitivity on the order of a few millimeters (sensitivity defined as minimum amount of movement that a sensor can detect with high fidelity), enough to detect even the small movements of a sleeping human. In the systems described herein, DMAs can operate at a single frequency or a narrow bandwidth. This possibility drastically simplifies the RF hardware requirements and the overall cost, while also mitigating concerns over interference with other electronic devices.

In accordance with these embodiments, applications for DMA systems include, but are not limited to, occupancy sensor systems in common residential buildings to set temperature settings (about 33% or more energy waste of residential buildings can thus be avoided); intruder detection with high precision and without requiring LOS operation; and monitoring vital signs of life (e.g., breathing rate) without any intrusive hardware using a rapid acquisition rate of the sensor systems (particularly important for the elderly and for infants).

Section headings as used in this section and the entire disclosure herein are merely for organizational purposes and are not intended to be limiting.

1. DEFINITIONS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

"Correlated to" as used herein refers to compared to.

Unless otherwise defined herein, scientific and technical terms used in connection with the present disclosure shall have the meanings that are commonly understood by those of ordinary skill in the art. For example, any nomenclatures used in connection with, and techniques of, cell and tissue culture, molecular biology, immunology, microbiology, genetics and protein and nucleic acid chemistry and hybridization described herein are those that are well known and commonly used in the art. The meaning and scope of the terms should be clear; in the event, however of any latent ambiguity, definitions provided herein take precedent over any dictionary or extrinsic definition. Further, unless otherwise required by context, singular terms shall include pluralities and plural terms shall include the singular.

2. SYSTEMS AND METHODS

Embodiments of the present disclosure provide a motion detection system that includes a transmitting antenna configured to emit arbitrary radiation patterns at a single operating frequency. The transmitting antenna can be any antenna capable of emitting arbitrary radiation patterns into a given indoor environment. In some embodiments, the transmitting antenna can be a dynamic metasurface aperture (DMA). DMAs include devices capable of producing arbitrary radiation patterns that can be varied with simple electronic controls. DMAs are particularly advantageous for the RF imaging systems and methods of the present disclosure because they simplify the imaging system's physical layer in the context of computational imaging schemes, shifting the burden from hardware to software. A variety of DMA designs exists for both beam forming and imaging applications, ranging from one-dimensional microstrip implementations to disordered three-dimensional cavities.

In some embodiments, the DMA is constructed as a three-dimensional cavity. In accordance with these embodiments, the three-dimensional cavity of the DMA can include an artificial impedance surface and one or more varactor diodes (e.g., MACOM MAVR-011020-1411 varactor diodes). A controllable boundary can be created by placing an artificial impedance surface on one wall of the three-dimensional cavity and enabling binary tunability with varactor diodes. This cavity can be excited by, for example, a waveguide, and the wall opposite the tunable impedance surface can be perforated so that it radiates. In some embodiments, a surface opposite the artificial impedance surface can be perforated with a plurality of randomly positioned irises (e.g., at least 150 randomly placed irises). In some embodiments, this configuration can produce complex field patterns associated with the DMA's boundary configurations. Used as a transmitting antenna in different random configurations of its controllable boundary, the DMA emits arbitrary radiation patterns that each overlap differently with the cavity modes' spatial patterns.

Embodiments of the present disclosure provide a motion detection system that also includes at least one receiver antenna configured to collect one or more signals generated when an object alters the arbitrary radiation patterns emitted by the transmitting antenna. In some embodiments, the receiver antenna is a DMA. Use of a DMA as the receiver antenna can significantly increase the number of independent measurements, for example, by providing the ability to tune both Et and Er (at the potential cost of a reduced signal-to-noise ratio). In other embodiments, the receiver antenna is a monopole antenna. As would be recognized by one of ordinary skill in the art based on the present disclosure, other transmitting antenna/receiver antenna combinations can be used with the systems and methods described herein, including multiple types, numbers, and combinations of antennas not specifically exemplified.

In accordance with the embodiments described above, the system can be configured to capture temporal variations in a complex indoor environment. In some embodiments, motion within an indoor environment (a disordered cavity) can be detected, even outside the line-of-sight, working at a single frequency. The use of a single operating frequency can preclude having to design complex and costly broadband hardware, and can minimize spectrum allotment problems. In some embodiments, the single operating frequency is at least about 5.0 GHz. In some embodiments, the single operating frequency ranges from about 5.0 to about 300.0 GHz. In some embodiments, the single operating frequency ranges from about 5.0 to about 250.0 GHz. In some embodiments, the single operating frequency ranges from about 5.0 to about 200.0 GHz. In some embodiments, the single operating frequency ranges from about 5.0 to about 150.0 GHz. In some embodiments, the single operating frequency ranges from about 5.0 to about 100.0 GHz. In some embodiments, the single operating frequency ranges from about 5.0 to about 50.0 GHz. In some embodiments, the single operating frequency ranges from about 5.0 to about 25.0 GHz. Additionally, in some embodiments, the system operates at a wavelength of about 3.0 mm or less. In some embodiments, the operating wavelength is about 1.55 cm.

In some embodiments, the transmitting antenna can include DMA, and capturing temporal variations in a complex indoor environment involves using a plurality of DMA masks. In some embodiments, capturing temporal variations in a complex indoor environment includes detecting periodic motion of one or more objects and estimating a period of the one or more objects' motion based on intensity measurements from the plurality of DMA masks. In some embodiments, the plurality of random DNA masks can include from about 50 to about 1000 DNA masks. In some embodiments, the plurality of random DNA masks can include from about 50 to about 900 DNA masks. In some embodiments, the plurality of random DNA masks can include from about 50 to about 800 DNA masks. In some embodiments, the plurality of random DNA masks can include from about 50 to about 700 DNA masks. In some embodiments, the plurality of random DNA masks can include from about 50 to about 600 DNA masks. In some embodiments, the plurality of random DNA masks can include from about 50 to about 500 DNA masks. In some embodiments, the plurality of random DNA masks can include from about 50 to about 450 DNA masks. In some embodiments, the plurality of random DNA masks can include from about 50 to about 400 DNA masks. In some embodiments, the plurality of random DNA masks can include from about 50 to about 350 DNA masks. In some embodiments, the plurality of random DNA masks can include from about 50 to about 300 DNA masks. In some embodiments, the plurality of random DNA masks can include from about 50 to about 250 DNA masks. In some embodiments, the plurality of random DNA masks can include from about 50 to about 200 DNA masks. In some embodiments, the plurality of random DNA masks can include from about 50 to about 150 DNA masks. In some embodiments, the plurality of random DNA masks can include from about 50 to about 100 DNA masks.

In some embodiments, detecting the one or more objects' periodic motion and estimating its period facilitates identification of the temporal variations in the complex indoor environment. In some embodiments, the temporal variations comprise one or more vital signs of a human subject, including but not limited to, heart rate, breathing rate, respiration rate, and the like.

Embodiments of the present disclosure also provide methods of detecting a lifeform in a complex indoor environment, such as by detecting one or more vital signs of the lifeform (e.g., a human subject). In accordance with these embodiments, the method includes configuring a transmitting antenna to emit arbitrary radiation patterns at a single operating frequency, configuring at least one receiver antenna to collect one or more signals generated when an object alters the arbitrary radiation patterns emitted by the transmitting antenna, generating a temporal signature of the complex indoor environment by obtaining continuous transmission measurements, and identifying at least one temporal variation in the temporal signature.

In some embodiments, the transmitting antenna is a dynamic metasurface aperture (DMA), and the at least one receiver antenna is a DMA or a monopole antenna. In some embodiments, the DMA comprises a three-dimensional cavity that includes an artificial impedance surface and one or more varactor diodes. In some embodiments, a surface opposite the artificial impedance surface is perforated with a plurality of randomly positioned irises.

Embodiments of the methods of detecting motion in a complex indoor environment also include use of the systems described herein, including variations of the systems, as would be recognized by one of ordinary skill in the art based on the present disclosure.

3. EXAMPLES

It will be readily apparent to those skilled in the art that other suitable modifications and adaptations of the methods of the present disclosure described herein are readily applicable and appreciable, and may be made using suitable equivalents without departing from the scope of the present disclosure or the aspects and embodiments disclosed herein. Having now described the present disclosure in detail, the same will be more clearly understood by reference to the following examples, which are merely intended only to illustrate some aspects and embodiments of the disclosure, and should not be viewed as limiting to the scope of the disclosure. The disclosures of all journal references, U.S. patents, and publications referred to herein are hereby incorporated by reference in their entireties.

The present disclosure has multiple aspects, illustrated by the following non-limiting examples.

Example 1

Experimental Setup

Various embodiments of the present disclosure include conducting experiments in a disordered metallic cavity, which provides a well-controlled environment for testing. The cavity is very large (1.4 m$^3$) compared to the wavelength of 1.55 cm at our working frequency of $f_0$=19.4 GHz. Operating in the K-band ensures sensitivity to motion on the order of the millimeter while maintaining a reasonably small DMA size of a few centimeters. An L-shape cavity layout was chosen, as shown in FIG. 1A, to ensure that motion can be created that is clearly outside the line-of-sight of the probing antennas—a DMA and a monopole antenna for transmitter and receiver, respectively. The cavity's quality factor was estimated from the decay rate of the transmission spectrum's inverse Fourier transform to be about 2000 such that by Eq. 2 there are about 2400 modes overlapping at the working frequency. This experimental setup is similar to a strong room or vault (such as that found in a bank), for example, where motion detection is crucial and yet difficult due to the complicated geometry.

As depicted in FIG. 1, two objects are placed "around-the-corner." Object 1 is a small aluminum block that can be moved on a rotation stage in a circle of radius 5 cm. Object 2 is an aluminum corner mounted onto a linear 55 cm rail. Metallic objects were chosen to mimic the human skin's high reflectivity characteristics in the K-band. The dimensions of both objects (FIG. 1) are only a few wavelengths and are significantly smaller compared to the cavity size. To some extent, the experimental setup resembles the use of mode-stirrers in reverberation chambers to achieve maximal mode perturbations for electromagnetic compatibility analysis; in contrast, minimal perturbations were detected here.

The cavity-backed DMA was used to test the motion detection systems of the present disclosure. This DMA, illustrated in FIG. 1B, is an electrically large disordered cavity (11×11×5.5 cm$^3$) with 150 randomly-placed irises on one of its walls, such that the multitude of distinct modes supported by the cavity couple to spatially distinct radiative modes. Another DMA cavity wall is covered with a 4×4 matrix of binary tunable impedance pixels (each of which contains 4×4 elements with a parallel voltage bias), enabling one to independently change the reflection phase of each pixel by r. This tuning is facilitated by varactor diodes (e.g., MACOM MAVR-011020-1411), which provide continuous capacitive tuning, but a binary 0 V/5 V scheme was used to maintain a simple system. By tuning this voltage with an Arduino microcontroller, the modes supported by the cavity and consequently the radiated fields can be tuned. As would be appreciated by one of ordinary skill in the art, real-life implementation can include alternative DMA designs, such as planer devices.

The experiments described herein were conducted using an arbitrary time scale. A series of transmission measurements were taken with a network analyzer at instant $t_i$, then Object 1 or both objects or neither move "instantaneously," and then the next series of transmission measurements were taken at instant $t_{i+1}$. This enables well-controlled experiments and is an accurate approximation to real-life applications, where improved electronics and a custom single-frequency radio can enable the transmission measurements to be carried out at MHz frame rates (relative to which any human or mechanical motion is almost static for the duration of a few hundred measurements).

Figure 2:
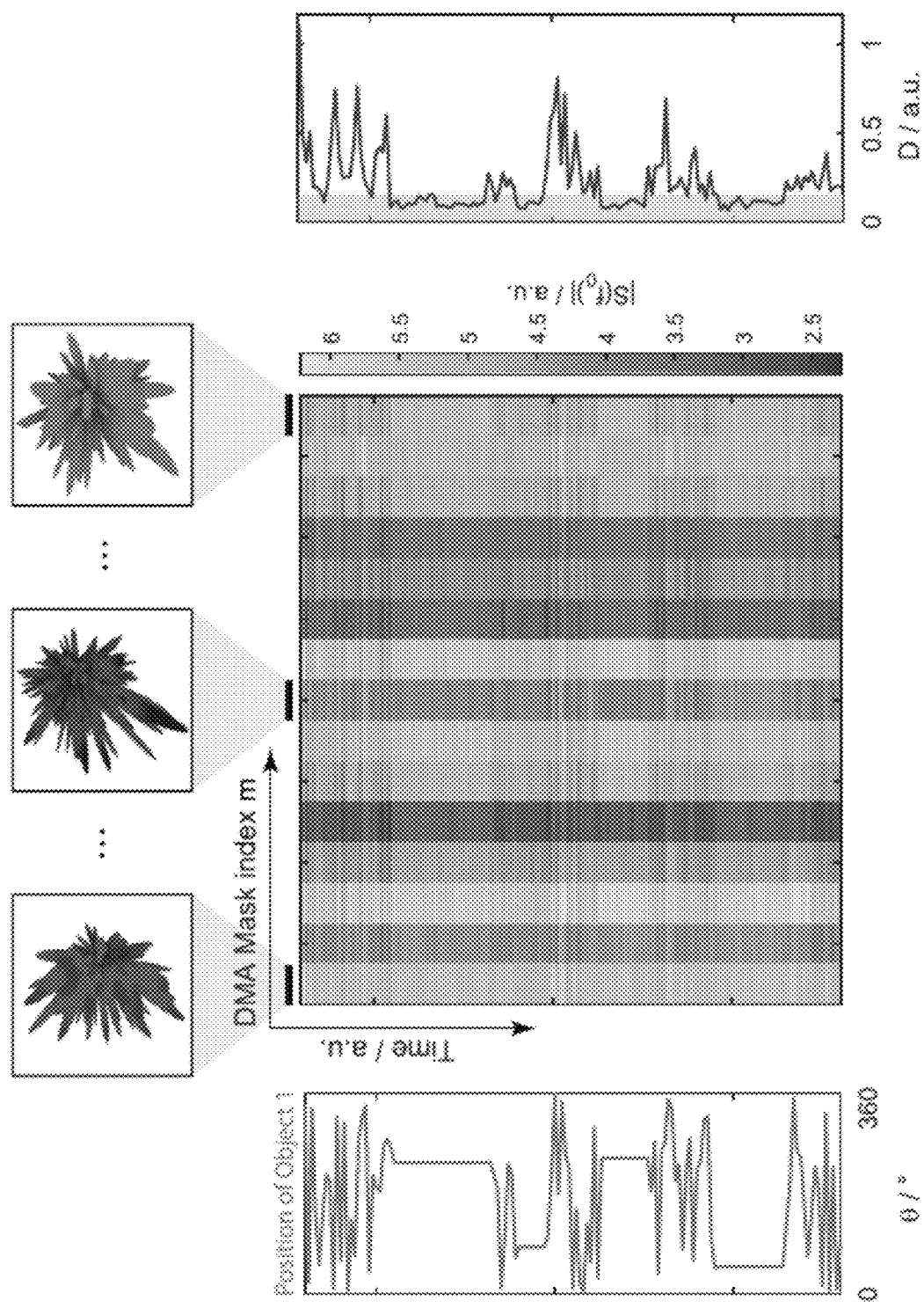
FIG. 2 includes representative results obtained by measuring a complex-valued matrix W whose entry $W(t_i, m)$ is the transmission $S(f_o)$ between the DMA and the monopole antenna at time $t_i$ for the mth random DMA configuration. Here |W| is displayed with time along the vertical and the DMA mask index along the horizontal axis. The angular position of the moving Object 1 as a function of time is indicated, as well as some sample radiation patterns for different random DMA configurations. Shown on the right is how thresholding the quantity D calculated from W according to Eq. 4 identifies when motion occurred and when not.

Over the course of these experiments, a complex-valued matrix W was obtained, as indicated in FIG. 2, containing for each moment in time the transmission values at the working frequency for a set of random DMA configurations. The entry $W(t_i, m)$ is the transmission $S(f_0)$ between the DMA and the monopole antenna at time $t_i$ for the mth random DMA configuration. To decide whether motion occurred between instants $t_i$ and $t_{i+1}$, how much the transmission changed was first estimated:

$$D = \langle |W(ti+1,m) - W(ti,m)| \rangle_m, \quad \text{(Eq. 4)}$$

where $\langle \ldots \rangle_m$ denotes averaging over the measurements taken at each time step. Note, as discussed below, that this averaging has a deeper statistical motivation beyond simply improving the signal-to-noise ratio. The value of D was then compared to a threshold $D_{thresh}$ related to the noise floor. $D_{thresh}$ was estimated as the average of D plus three times its standard deviation over 100 "initiation" measurements known to be motionless. As illustrated in FIG. 2, by inspection the binary decision of whether D lies above or below the threshold reliably correlates with the occurrence of motion.

Example 2

Use of a Dynamic Metasurface Aperture

The efficacy of the "around-the-corner" motion detector was investigated, along with its dependence on the number of measurements M at every moment in time. To quantify the performance, the false positive and false negative detection rates obtained for a long motion sequence of Object 1 were estimated, including intervals of random motion and intervals of rest, similar to the example interval in FIG. 2. The false positive (negative) rate was defined as the number of time steps at which motion was incorrectly detected to have occurred (not have occurred), compared to the total number of time steps. False negatives constitute a significant challenge to be overcome, be it a Smart Home's temperature and lighting control or an intruder alarm, and should be kept as low as possible. To demonstrate the benefit of using a DMA with M different radiation patterns $E_t$ over making M repeated measurements with a non-tunable antenna of fixed radiation pattern Et, measurements were conducted for three different scenarios. In the first case, M different DMA radiation patterns were used. In the second case, one fixed (randomly selected) DMA pattern was used and the measurement was repeated M times (to have similar benefits of multiple measurements on the signal-to-noise ratio). In the third case, the DMA was replaced with a standard K-band open-ended rectangular waveguide and the measurement was repeated M times. The latter cases resemble the technology used, for example, in motion detection based on ambient Wi-Fi fields, where a fixed antenna emits the signal.

Figures 3A, 3B, 3C, 3D, 3E:
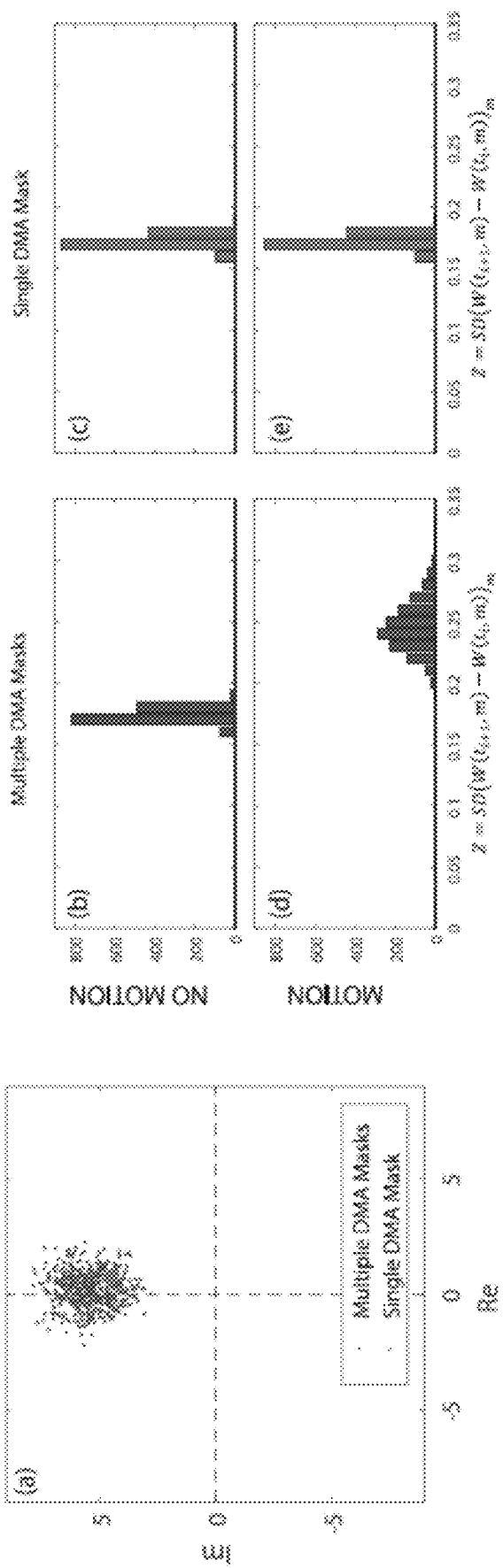
FIGS. 3A-3E includes representative results of separating DMA's effect from background noise.

To begin with, the extent to which the DMA can impact the transmission was visualized. In FIG. 3A, the measured $S(f_0)$ was plotted for 500 random DMA configurations in the same static cavity without any motion. Each blue dot is the sum of all the modes, weighted according to the corresponding DMA configuration, as expressed in Eq. 3. Neither the modes Φ nor the radiation patterns $E_t$ and $E_r$ are explicitly known, but the effect of their interplay we observed, as shown in FIG. 3A, as $E_t$ was altered with the DMA. To separate the DMA's effect from simple measurement noise, 500 measurements of a fixed, randomly selected DMA configuration were additionally plot for reference in red, implying a fixed $E_r$. As clearly demonstrated, the radius of the red cloud is very small compared to the blue cloud, implying that the observed transmission variations visualized with the blue dots are indeed due to the aforementioned mechanism of assigning different weights to different modes.

The DMA-based motion detections systems described herein detect changes of the transmission as motion induces cavity geometry changes. One advantage of using a DMA is that, on average, due to its ability to apply different weights to different modes, it can achieve a higher sensitivity than a non-tunable antenna. Although a non-tunable antenna could perform better or worse depending on the exact geometry, real-life scenarios are rarely restricted to a single specific case since the geometry of an indoor environment constantly evolves as objects move. It is thus instructive to visualize the distribution of $$Z=SD(W(t_{i+1},m)-W(t_i,m))_m \quad \text{(Eq. 5)}$$

over many realizations. This quantity Z, the standard deviation of the M transmission measurement changes between two consecutive time steps, is closely linked to the detection sensitivity. For a non-tunable antenna, Z=0 in a noiseless system both if motion occurred or not, as confirmed by the measurements described herein. With noise, the same narrow distribution is observed in FIGS. 3C and 3E. When motion occurs, in some DMA configurations the change of the transmission will have been large, enabling detection, but others are minimal, such that the motion was not detected. In contrast, with a dynamic antenna, the Z distribution for the case that motion occurred (FIG. 3D), is very different. When motion occurs, some of the random configurations will yield very large and others very small transmission changes for any given case, as revealed in FIG. 3D. Thus, the combination of many dynamic configurations will statistically (that is, over a large number of realizations) outperform the non-tunable antenna. For any given scenario, sufficient measurements with different random DMA configurations will naturally always contain some configurations that yield large transmission changes, such that a zero false negative rate is achieved, as in FIG. 4C. In contrast, a non-tunable antenna, employed for example in systems that utilize Wi-Fi signals, will inevitably come across scenarios in which its fixed radiation pattern corresponds only to a very small transmission change, explaining why the two approaches with fixed radiation pattern do not achieve a zero false negative rate, as in FIG. 4C. The DMA-based motion detection systems provided herein solve this problem. That is, they can significantly reduce false negatives, while, as described further below, simplifying the analysis to discern more information.

As a means of achieving a simplified hardware implementation, intensity-only measurements were investigated. While the loss of phase information does not prevent the DMA-based detection from reaching a zero false negative rate, at the cost of a few more measurements M, FIG. 4D demonstrates that the antennas with fixed radiation pattern have an unacceptably high false negative rate even with a vastly larger number of measurements M The advantage of using a dynamic antenna is thus enhanced in the case of intensity-only measurements. Phaseless measurements make it impossible to pick up the difference between S and S+δS if |S|≈|S+δS|: this happens for example if arg(δS) is close to arg(S)+π/2 as both quantities have the same amplitude, lying on the same circle around the origin of the complex plane. With an antenna of fixed radiation pattern, over a long series of measurements, this will inevitably occur a considerable amount of times, as evidenced by the pronounced difference between the results obtained with tunable and non-tunable antennas in FIG. 4D. With a dynamic radiation pattern, among the tested random patterns there will also be a few for which the motion of an object has mainly changed arg(S) without appreciable impact on |S|, but the majority of the random patterns will correspond to a detectable change of |S|. FIG. 3A demonstrates how random DMA configurations explore a wide variety of arg(S).

Figures 4A, 4B, 4C, 4D:
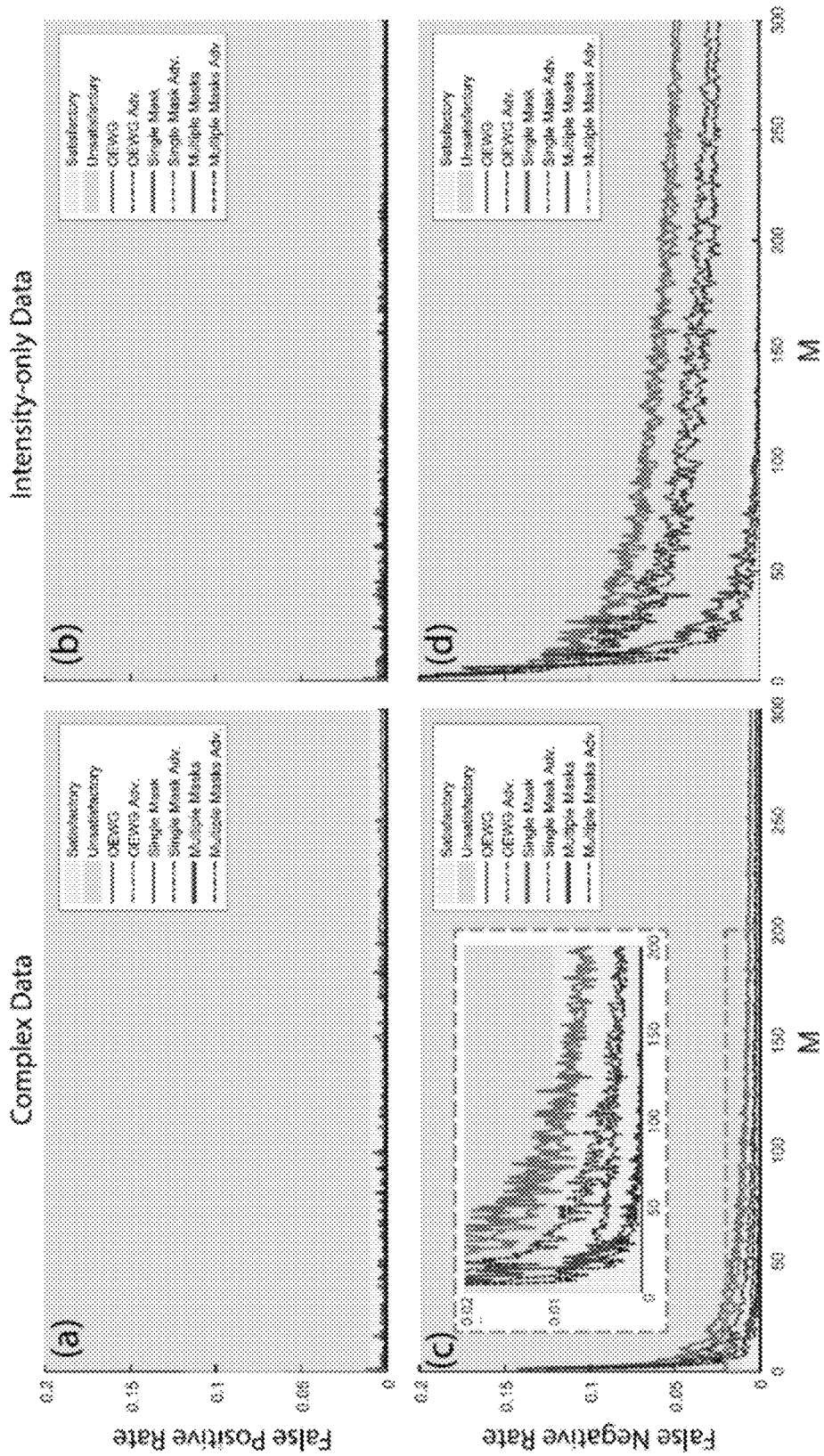
FIGS. 4A-4D include representative results of the dependence of false positive (FIGS. 4A and 4B) and false negative (FIGS. 4C and 4D) rates on the number of measurements M, with (FIGS. 4A and 4C) or without (FIGS. 4B and 4D) phase information. Results contrast using M different random DMA configurations (blue) with M repeated measurements of a fixed random DMA configuration (red) or a simple open-ended waveguide probe (OEWG) (green). The dash-dotted lines are obtained by using the knowledge that in a given interval motion does not occur or stop only at a single moment in time.

The motion detection performance can be augmented through the use of prior knowledge. Due to the use of MHz frame rates, if motion is (not) detected at a given instant $t_i$, it is assumes this will be the case if motion was also (not) detected at $t_{i-1}$ or $t_{i+1}$. This extra constraint is fitting in many applications such as, for example, considering that no intruder appears inside an indoor environment for only a few milliseconds. The results with this added information are traced in FIG. 4 as dash-dotted lines; for the false negative rate they outperform the results without this knowledge in all cases. The results of FIG. 4 demonstrate that adding some (albeit trivial) knowledge can enable one to achieve similar results with fewer measurements M. As a numerical comparison, if intensity-only data from multiple DMA configurations is used, an acceptable false negative rate is already reached with roughly M=30 rather than 50 (FIG. 4D).

Figure 5:
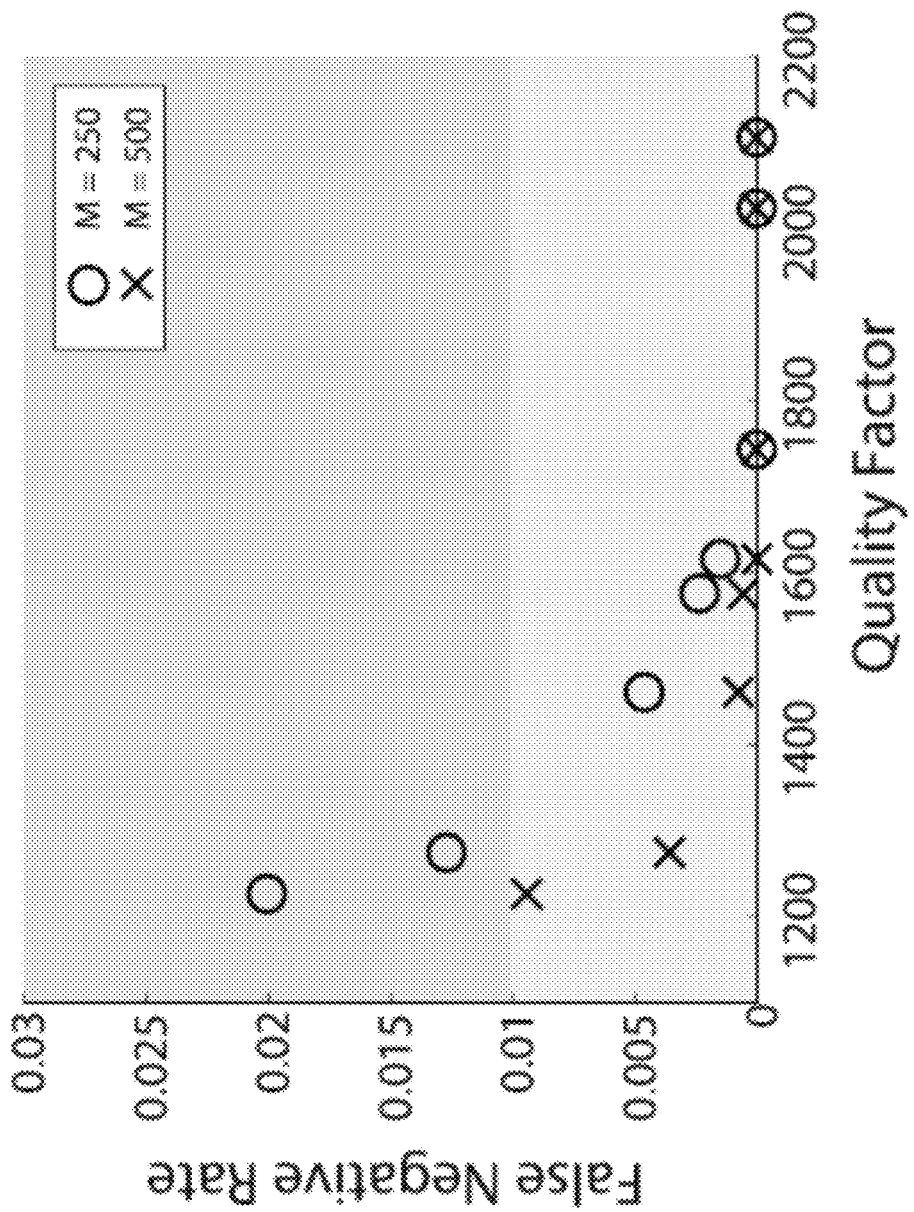
FIG. 5 includes representative results of the impact of the room quality factor on the detection sensitivity, exemplified by the case of the false negative rate obtained with complex data and additional knowledge, using M=250 and M=500 random DMA masks.

Finally, the effects of the room's quality factor Q on the detection sensitivity was investigated. While the experimental setup closely resembled metallic strong rooms, other environments such as residential and office rooms or warehouses are lossier and leakier for radiowaves. They thus have a lower quality factor. To lower the cavity's quality factor, pieces of electromagnetic absorbers were placed at random positions in the cavity. The previous experiments were repeated several times with different amounts of absorbing material. In FIG. 5, the detection sensitivity's dependence on Q is shown, exemplified by the case of the false negative rate using complex data from M random DMA configurations and the aforementioned additional knowledge. As expected, a higher Q factor, implying more reverberation as well as a higher signal-to-noise ratio, due to less absorption, gives better results. FIG. 5 demonstrates that as Q is decreased, more measurements M are needed to achieve the same detection sensitivity. Yet the gain in information content as function of the number of configurations used saturates somewhere between 150 and 200, due to correlations between the radiation patterns. Needing significantly more than 200 DMA configurations at lower Q factors can hence be attributed to the deteriorated signal-to-noise ratio and does not seem to be an intrinsic sensitivity limitation, as seen for example in FIG. 4D for intensity-only data from non-tunable antennas. The adverse effects of lower Q, including the lower signal-to-noise ratio, can thus be counterbalanced with simple measures such as increasing the receiver's dynamic range as well as taking more measurements. It some cases, the DMA used in these experiments is not optimized for a high radiation efficiency or number of modes. In an ultimate implementation, such considerations can be taken into account to obtain the desired performance at a reasonable measurement speed. A further possibility is to use another DMA as the receiver, which significantly increases the number of independent measurements by providing the ability to tune both $E_t$ and $E_r$ (at the potential cost of a reduced signal-to-noise ratio).

Example 3

Temporal Signatures

Having investigated the impact of several key parameters (e.g., number of measurements, phase information, a priori knowledge, room quality factor), the possibility of acquiring temporal signatures of the (non-line-of-sight) motion was investigated. This is particularly useful to characterize and identify a source of motion. To demonstrate this capability, testing focused on identifying purely periodic motion and the extraction of the corresponding period. This is of interest, for example, to distinguish a rotating fan's motion from that of an intruder or to monitor a patient's respiration rate. The experimental setup emulated a process (FIG. 6A) that included intervals with no motion, intervals with purely periodic motion of Object 1 for various periods, and intervals of aperiodic motion of Objects 1 and/or 2. The final case was introduced in one of two ways: once with random motion of Object 2 along its rail while Object 1 moves periodically, and once with random values added to the exact positions of Object 1 required for periodic motion. The results described below were obtained from an intensity-only data set for M=150 random DMA configurations.

The periodicity of the motion is encoded in repeating patterns in the transmission measurements. From the M measurements at each time step, the below quantity was obtained.

$$U(t) = \langle |W(t,m)| \rangle_m \quad \text{(Eq. 6)}$$

The averaging here is not solely a way of improving the signal-to-noise ratio; the use of different masks is used to achieve an optimal sensitivity which is important for an accurate identification of purely periodic motion. A band-pass filter was applied, in this case prohibiting periods smaller than 2 or larger than 150, which is necessary due to measurement noise. The resultant filtered quantity $U_{filt}$, displayed in FIG. 6B, by inspection clearly contains periodic variation where expected.

To identify intervals of purely periodic motion based on $U_{filt}$ and moreover to estimate the period, experiments proceeded in two steps. First, a simple periodicity estimation was applied through a sliding window of length $\Delta t_1 = 200$. For each window, it extracts the peaks of the autocorrelation and evaluates their separation. This is the raw period estimate $T_R$ for the moment $t_i$ that corresponds to the center of the respective window. As displayed in FIG. 6C, this procedure accurately estimates the period and also identifies intervals without purely periodic motion; however, this method is less accurate on short time scales and may return an incorrect estimate, for example, when the periodic motion is distorted briefly.

Figures 6A, 6B, 6C, 6D, 6E:
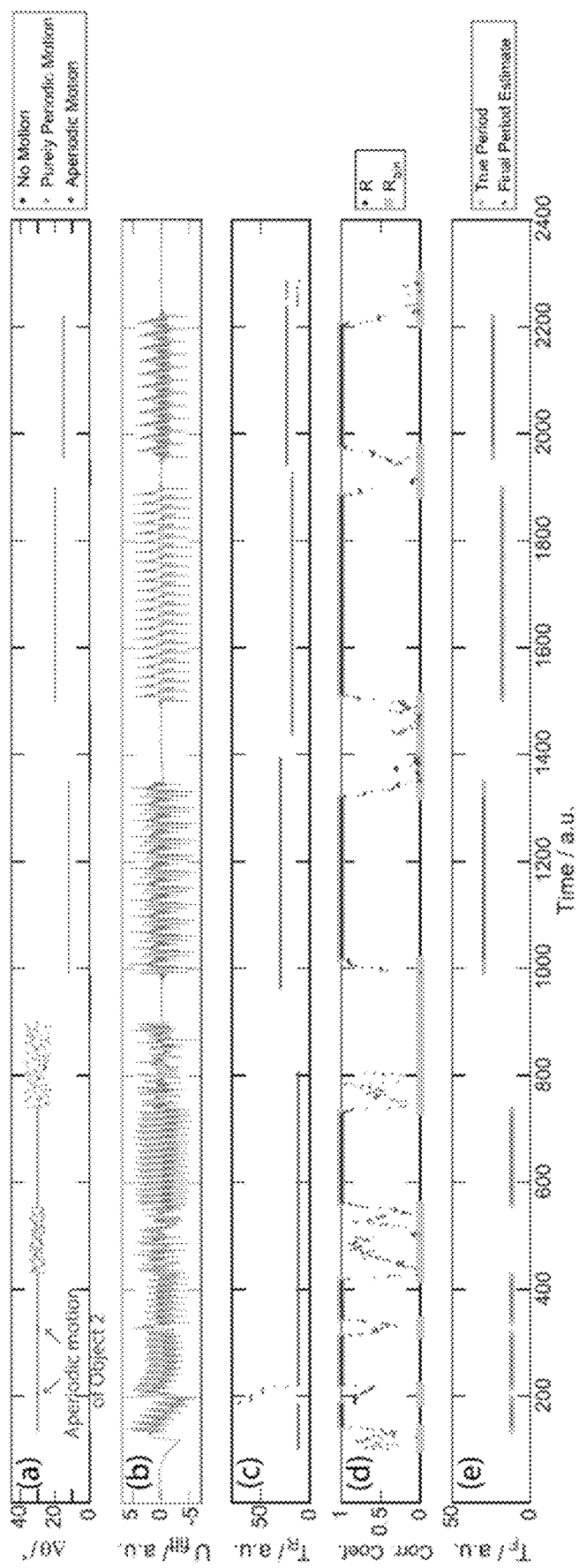
FIGS. 6A-6E include representative results from detecting purely periodic motion and estimating its period, based on intensity-only data from M=150 random DMA masks. Angular displacement of Object 1 over a test interval, color-coded as shown in the legend (FIG. 6A). Aperiodicity is introduced once through random motion of Object 2 while Object 1 moves periodically and once by adding noise to the exact positions of Object 1 required for periodic motion (see FIG. 1). The bandpass filtered quantity $U_{filt}$, processed from the measurement matrix W as discussed herein (Eq. 6), used to extract the desired information (FIG. 6B). The raw estimate $T_R(t)$ of the motion's periodicity (FIG. 6C). The linear correlation coefficient R, which confirms purely periodic motion detected in FIG. 6C if it is very close to unity (FIG. 6D). The combined overall results, showing consistent agreement both in terms of distinguishing pure periodicity from no motion or aperiodicity as well as estimating the period (FIG. 6E).

The inaccuracy on short time scales lead to development of the second step of the processing, which seeks to validate the raw results on a time scale much shorter than $\Delta t_1$. A sliding window of variable length was used. For every moment in time $t_i$, the signal in the intervals $t_i - T_R(t_i) < t < t_i$ and $t_i < t < t_i + T_R(t_i)$ was compared, where $T_R(t_i)$ is the previously obtained raw estimate of the period for that moment in time $t_i$. When their linear correlation coefficient is very close to unity (FIG. 6D), purely periodic motion as estimated previously occurred at $t_i$. The resultant fine period estimates $T_F(t)$, on display in FIG. 6E, provide more accurate estimations of the period and correctly identify intervals of pure periodicity. Moments without motion or with aperiodic motion are also correctly identified. The remaining difference between the true and the finely estimated results is at the beginning and end of intervals of pure periodicity, which is a phenomenon that is linked to the finite length of the second sliding window but is negligible for practical applications.

The results presented in FIG. 6 can also be interpreted in the following manner: consider Object 1 as a moving background (e.g., a fan) while we try to detect motion of Object 2 (e.g., a human). Although motion is detected all the time due to Object 1, the "smart" analysis of the temporal variations in the transmission changes enables the identification of when the detected motion ceases to be purely periodic due to additional motion of Object 2. This performance exemplifies the ability of the proposed sensor to operate in different and complex environments, without requiring many instructions from a user.

Imaging, tracking, and other sensing tasks (such as pose recognition of objects hidden behind thin scattering layers or around corners) have been explored with a variety of different approaches in optics on small scales. Similar objectives on larger scales, corresponding to the microwave domain, are sought after in the quest for context-aware buildings. Transposing the ideas demonstrated with light passing through or reflected off thin multiply-scattering layers to disordered microwave cavities is not as trivial as invoking the theory of images. While wave transport is very sensitive to small perturbations in both problems, the present disclosure investigated detection inside rather than behind the complex medium which substantially complicates the problem.

As described herein, how any motion inside an indoor environment (a disordered cavity) can be detected, even outside the line-of-sight, working at a single frequency, was investigated. The benefit of using a dynamic metasurface aperture (DMA) that can emit different random radiation patterns and thereby couple differently to the cavity modes were determined, enhancing the detection sensitivity in particular when working with intensity-only data. These data were used to accurately identify intervals of purely periodic motion and to characterize their period, enabling "smart" motion detection. Periodicity is detectable for any irregularly shaped orbit in any orientation that the object follows over and over again.

The DMA-based motion detection systems of the present disclosure demonstrate the ability to probe the wave field in independent ways at rapid rates with a simple hardware, which distinguishes it from common hardware solutions, and satisfies the requirements of a sensor for complex environments (e.g., homes, vaults, etc.). As demonstrated herein, radiowave solutions, which do not require objects to collaborate, for example, by being equipped with tags, have great potential for context-aware indoor environments that facilitate the detection of various aspects of lifeforms.

It is understood that the foregoing detailed description and accompanying examples are merely illustrative and are not to be taken as limitations upon the scope of the disclosure, which is defined solely by the appended claims and their equivalents.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the disclosure, may be made without departing from the spirit and scope thereof

What is claimed is:

1. A system comprising:
    a transmitting antenna configured to emit arbitrary radiation patterns at a single operating frequency, wherein the transmitting antenna is a dynamic metasurface aperture (DMA); and
    at least one receiver antenna configured to collect one or more signals generated when an object alters the arbitrary radiation patterns emitted by the transmitting antenna;
    wherein the system is configured to capture temporal variations in a complex indoor environment.

2. The system of claim 1, wherein the at least one receiver antenna is a DMA.

3. The system of claim 1, wherein the at least one receiver antenna is a monopole antenna.

4. The system of claim 1, wherein the DMA comprises a three-dimensional cavity.

5. The system of claim 4, wherein the three-dimensional cavity of the DMA comprises an artificial impedance surface and one or more varactor diodes.

6. The system of claim 5, wherein a surface opposite the artificial impedance surface is perforated with a plurality of randomly positioned irises.

7. The system of claim 4, further comprising a waveguide.

8. The system of claim 1, wherein the single operating frequency is at least about 5.0 GHz.

9. The system of claim 1, wherein the single operating frequency is from about 5.0 to about 300.0 GHz.

10. The system of claim 1, wherein the system operates at a wavelength of about 3.0 mm or less.

11. The system of claim 10, wherein the operating wavelength is about 1.55 cm.

12. The system of claim 1, wherein the transmitting antenna is a dynamic metasurface aperture (DMA), and wherein capturing temporal variations in a complex indoor environment comprises using a plurality of DMA masks.

13. The system of claim 12, wherein capturing temporal variations in a complex indoor environment comprises detecting periodic motion of one or more objects and estimating a period of the one or more objects' motion based on intensity measurements from the plurality of DMA masks.

14. The system of claim 13, wherein detecting the one or more objects' periodic motion and estimating its period facilitates identification of the temporal variations in the complex indoor environment.

15. The system of claim 14, wherein the temporal variations comprise one or more vital signs of a human subject.

16. A method of detecting a lifeform in a complex indoor environment, the method comprising:
configuring a transmitting antenna to emit arbitrary radiation patterns at a single operating frequency, wherein the transmitting antenna is a dynamic metasurface aperture (DMA);
configuring at least one receiver antenna to collect one or more signals generated when an object alters the arbitrary radiation patterns emitted by the transmitting antenna;
generating a temporal signature of the complex indoor environment by obtaining continuous transmission measurements; and
identifying at least one temporal variation in the temporal signature.

17. The method of claim 16, wherein the at least one receiver antenna is a DMA or a monopole antenna.

18. The method of claim 16, wherein the DMA comprises a three-dimensional cavity comprising an artificial impedance surface and one or more varactor diodes, and wherein a surface opposite the artificial impedance surface is perforated with a plurality of randomly positioned irises.

19. The method of claim 16, wherein the single operating frequency is from about 5.0 GHz to about 300 GHz.

20. The method of claim 16, wherein the at least one temporal variations comprise one or more vital signs of a human subject.

* * * * *